(12) United States Patent
Dunuwila et al.

(10) Patent No.: US 6,846,431 B1
(45) Date of Patent: Jan. 25, 2005

(54) ENVIRONMENTALLY BENIGN, NON-TOXIC, NON-CORROSIVE ENGINE COOLANT/ANTIFREEZE

(75) Inventors: Dilum D. Dunuwila, Okemos, MI (US); Kris A. Berglund, Okemos, MI (US)

(73) Assignee: Diversified Natural Products, Inc., East Lansing, MI (US)

( * ) Notice: Subject to any disclaimer, the term of this patent is extended or adjusted under 35 U.S.C. 154(b) by 0 days.

(21) Appl. No.: 10/746,096

(22) Filed: Dec. 26, 2003

(51) Int. Cl.$^7$ ............................................... C09K 5/00
(52) U.S. Cl. ............................ 252/71; 252/76; 252/79
(58) Field of Search ........................... 252/70, 71, 76, 252/79

(56) References Cited

U.S. PATENT DOCUMENTS

| | | | |
|---|---|---|---|
| 4,448,702 A | 5/1984 | Kaes | |
| 5,143,834 A | 9/1992 | Glassner | |
| 5,173,429 A | 12/1992 | Gaddy | |
| 5,593,886 A | 1/1997 | Gaddy | |
| 5,807,722 A | 9/1998 | Gaddy | |
| 5,876,621 A | 3/1999 | Sapienza | |
| 5,980,774 A | * 11/1999 | Sapienza | 252/70 |
| 6,129,857 A | * 10/2000 | Sapienza | 252/70 |
| 6,156,226 A | 12/2000 | Klyosov | |
| 6,265,190 B1 | 7/2001 | Yedur | |
| RE37,393 E | 9/2001 | Donnelly | |
| 6,287,480 B1 | 9/2001 | Berglund | |
| 6,315,919 B1 | * 11/2001 | Sapienza | 252/70 |
| 6,340,581 B1 | 1/2002 | Gaddy | |
| 6,368,819 B1 | 4/2002 | Gaddy | |
| 6,455,284 B1 | 9/2002 | Gokarn | |
| 6,506,318 B1 | 1/2003 | Sapienza | |
| 6,509,180 B1 | 1/2003 | Verser | |
| 6,544,434 B2 | * 4/2003 | Sapienza | 252/70 |

* cited by examiner

Primary Examiner—Necholus Ogden
(74) Attorney, Agent, or Firm—Ian C. McLeod

(57) ABSTRACT

A liquid antifreeze which is produced from renewable resources, and which is biodegradable, non-toxic, and is non-corrosive to engines is provided. The liquid antifreeze composition for use as an engine coolant in a dilute or concentrate form comprises a water soluble salt of succinic acid, a water soluble salt of acetic acid, ethanol, and water, wherein the composition has a freezing point of greater than −30° C. in the engine. A method for cooling an engine with a cooling system which comprises the coolant compositions is also provided.

12 Claims, 2 Drawing Sheets

ENVIRONMENTALLY BENIGN, NON-TOXIC, NON-CORROSIVE ENGINE COOLANT/ ANTIFREEZE

CROSS-REFERENCES TO RELATED APPLICATION

Not Applicable.

STATEMENT REGARDING FEDERALLY SPONSORED RESEARCH OR DEVELOPMENT

Not Applicable.

BACKGROUND OF THE INVENTION (1) Field of the Invention

The present invention relates generally to engine coolant/ antifreeze, and more particularly the present invention relates to an engine coolant which comprises water soluble salts of succinic acid, water soluble salts of acetic acid, ethanol, and water.

(2) Description of Related Art

Many chemicals can achieve a freezing point depression greater than that of an aqueous solution. The freezing point depression of an antifreeze solution is a function of the properties of the chemical and the concentration of the chemical in the solution.

U.S. Pat. No. 4,448,702 to Kaes teaches lowering the freezing point of an aqueous system by adding a freezing point lowering quantity of water soluble salts of dicarboxylic acids having at least three carbon atoms, such as sodium, potassium, ammonium or organoamine salts of adipic, glutaric, succinic and malonic acids.

U.S. Pat. No. 5,876,621 to Sapienza teaches a deicing composition comprising hydroxycarboxylic acid esters or sugar compounds. Sapienza further teaches a method of preparing a deicing composition by recovering from an industrial waste stream hydroxycarboxylic acids, which are then alcoholized to convert the hydroxycarboxylic acids to hydroxycarboxylic acid esters.

U.S. Pat. No. 5,980,774 to Sapienza teaches a water soluble deicing composition comprising freezing point lowering compounds such as hydroxycarboxylic acid esters, glycosides and mixtures thereof. Sapienza further teaches methods of use, and preparation of such compounds by recovering from an industrial waste stream hydroxycarboxylic acids, and adding freezing point lowering compounds such as hydroxycarboxylic acid esters, glycosides and mixtures thereof.

U.S. Pat. No. 6,129,857 to Sapienza teaches a deicing and/or anti-icing composition comprising at least 15 weight percent of sorbitol and water and methods of deicing by applying the compositions. The deicing composition can further include freezing point lowering additives such as hydroxycarboxylic acid salts, acetate salts, formate salts, citrate salts, amino acids and salts of amino acids, dicarboxylic acid salts, lignin components, boric acid and boric acid salts, glycerol, and mixtures thereof.

U.S. Pat. No. 6,156,226 to Klyosov teaches liquid and solid de-icing and anti-icing agents comprising neutral or alkaline, non-chloride, non-phosphate and non-glycol compositions. The liquid compositions are based upon aqueous solutions of organic acid salts such as lactic acid, succinic acid, acetic acid, and formic acid salts. The solid compositions comprise organic-based porous pulp and paper sludge granules impregnated with the liquid de-icing composition. The liquid compositions can be obtained either by direct mixing of commercially available chemicals, by chemical transformation of commercially available acids, or by fermentation of sugars.

U.S. Pat. No. 6,287,480 to Berglund teaches deicing compositions which are suitable and effective for airport applications in which corrosion of magnesium based alloys is an issue. The deicing compositions are less corrosive upon steel and aluminum and certain magnesium based parts than conventional road salt. The compositions also inhibit the corrosive effects of conventional road salt. The deicing compositions include succinate salts, such as potassium succinate (trihydrate), ammonium succinate (anhydrous), sodium succinate (hexahydrate), either alone or in combination. Additionally, the deicing compositions include corrosion inhibiting, deicing amounts of potassium succinate together with 1) polymaleimide sodium salt and magnesium succinate, 2) magnesium succinate and sodium polyaspartate, 3) sodium polysuccinimide, 4) sodium polyaspartate and polymaleimide sodium salt, or 5) magnesium succinate.

U.S. Pat. No. 6,506,318 to Sapienza teaches deicing and anti-icing compositions comprised of hydroxyl-containing organic compounds and/or organic acid salts and methods of deicing and anti-icing using the compositions.

Antifreezes have a broad category of uses including use as deicing compounds which are typically applied at airports and roadways. These deicing compounds are usually solid and are applied to surfaces for the purpose of melting ice. They are also anti-icing in that they dissolve into any water which comes in contact with the surface, thereby lowering its freezing point and inhibiting ice build up.

Antifreezes also include the category of automobile engine coolants, which have unique characteristics in addition to preventing freezing. Engine coolants are necessarily liquids which have good heat transfer properties for cooling an engine during use, while also having antifreeze properties to prevent freezing when the engine is not active in cold weather. The engine coolants must be able to perform at high temperatures under pressure for extended times, as well as very cold temperatures. Engine coolant/antifreeze must also be non-corrosive to engine components. The performance of engine coolant/antifreeze solutions is governed by the American Society for Testing and Materials (A.S.T.M.) and the Society of Automotive Engineers (S.A.E.). The most widespread antifreeze presently used as an engine coolant consists of ethylene glycol.

Ethylene glycol is synthesized by the oxidation of ethylene in the presence of acetic acid producing ethylene diacetate, which is then hydrolyzed to the glycol. Ethylene glycol (1,2 ethanediol) has excellent performance properties, however it also has some undesirable properties. The U.S. Department of Health and Human Services and the U.S. Environmental Protection Agency have determined that ethylene glycol is acutely toxic to humans and animals. Also, the rate of biodegradation of glycols is an environmental concern considering the volume of engine coolant in use and the likelihood of leakage into the soil and waterways.

Propylene glycol (1,2 propanediol) is used as an alternative to ethylene glycol due to its decreased toxicity, however there is still a demand to replace glycols used in engine coolants with more environmentally friendly and non-toxic alternatives. Any replacement engine coolant/antifreeze must have adequate antifreeze and cooling capacities.

Another important consideration with any engine coolant/ antifreeze is the corrosion which it causes within an engine, and the chemical interactions of the coolant with hose and gasket elastomers. Oxidation products of ethylene glycol include formic acid and glycolic acid. The corrosive properties of a coolant and its oxidation products can destroy components of the engine. Since this corrosiveness can lead to failure of the engine, any replacement engine coolant/ antifreeze should have low corrosivity.

While related art antifreezes all decrease the freezing point of aqueous solutions to some extent, there is still a need to develop liquid antifreeze solutions which have performance properties that are required in an engine coolant/antifreeze. Additionally, there is a need to develop an engine coolant/antifreeze produced from non-toxic renewable resources. Therefore, it would be desirable to have a high-performance engine coolant/antifreeze which is produced from renewable resources that are biodegradable, non-toxic, and non-corrosive to engines.

SUMMARY OF THE INVENTION

The present invention provides a liquid biodegradable antifreeze composition as a concentrate for use as an engine coolant which comprises a water soluble salt of succinic acid, a water soluble salt of acetic acid, and ethanol, wherein the composition is formulated to be mixed with water to provide a freezing point of lower than −30° C. in the engine. In further embodiments of the present invention the salts are potassium salts. In further still embodiments the succinate salt is dipotassium succinate. In further embodiments the composition, when diluted with water, contains between about 0.1 to 50% by weight of potassium succinate, 0.1 to 50% by weight of potassium acetate and 0.5 to 55% by weight of ethanol.

The present invention provides a liquid antifreeze composition as an engine coolant which comprises a water soluble salt of succinic acid, a water soluble salt of acetic acid, ethanol, and water, wherein the composition provides a freezing point of lower than −30° C. in the engine. In further embodiments the salts are potassium salts. In further still embodiments the succinate salt is dipotassium succinate. In further embodiments the composition, which is diluted with water, contains between about 0.1 to 50% by weight of potassium succinate, 0.1 to 50% by weight of potassium acetate and 0.5 to 55% by weight of ethanol.

The present invention provides a method for cooling an engine with a cooling system which comprises: providing a liquid antifreeze composition as an engine coolant which comprises a water soluble salt of succinic acid, a water soluble salt of acetic acid, ethanol, and water, wherein the composition provides a freezing point of lower than −30° C. in the engine; introducing the composition into the cooling system of the engine; and running the engine containing the coolant. In further embodiments of the method the salts are potassium salts. In further still embodiments of the method the succinate salt is dipotassium succinate. In further embodiments of the method the composition, which is diluted with water, contains between about 0.1 to 50% by weight of potassium succinate, 0.1 to 50% by weight of potassium acetate and 0.5 to 55% by weight of ethanol.

OBJECTS

Therefore, it is an object of the present invention to provide a liquid biodegradable antifreeze composition for use as an engine coolant.

Another object of the present invention is to provide a method for cooling an engine with the liquid biodegradable antifreeze composition.

These and other objects will become increasingly apparent by reference to the following description and the drawings.

DETAILED DESCRIPTION OF THE INVENTION

Figure 1:
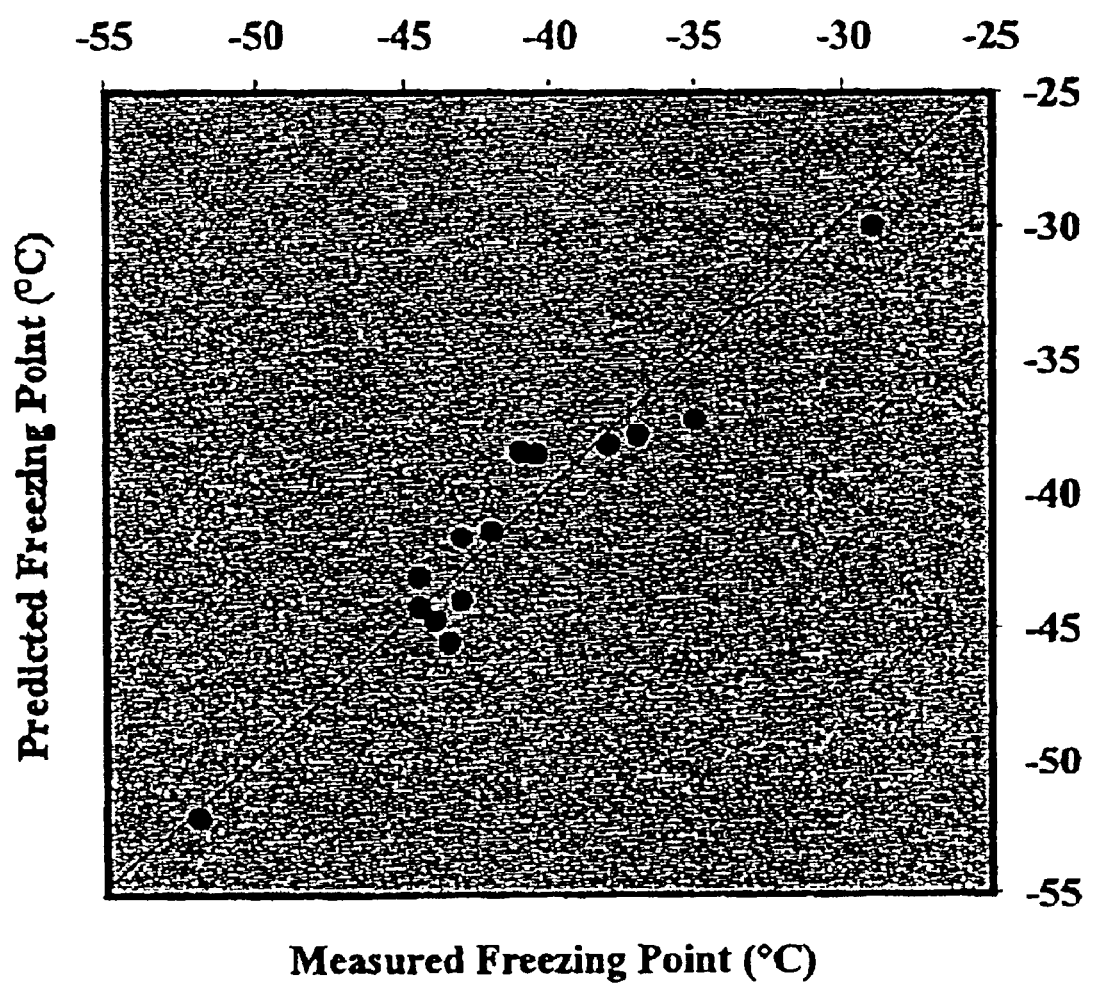
FIG. 1 illustrates the correlation between observed freezing point data of Table 1 and predicted freezing points from the empirical model.

All patents, patent applications, government publications, government regulations, and literature references cited in this specification are hereby incorporated herein by reference in their entirety. In case of conflict, the present description, including definitions, will control. Definitions for the following terms are provided to promote a further understanding of the present invention.

The term "antifreeze" refers to a composition which reduces the freezing point of an aqueous solution, or is an aqueous solution with a reduced freezing point with respect to water.

The term "engine coolant" refers to a category of liquid antifreeze compositions which have properties that allow an engine to function effectively without freezing, boiling, or corrosion. The performance of an engine coolant must meet or exceed standards set by the American Society for Testing and Materials (A.S.T.M.) and the Society of Automotive Engineers (S.A.E.).

Carboxylic acids, such as succinic acid, are renewable resources that can be produced in fermentation processes from E. coli. Anaerobic fermentation processes for producing succinic acid utilizing A. succiniproducens have been described in U.S. Pat. No. 5,143,834 herein incorporated by reference. Other approaches of producing succinic acid include culturing mutant strains of E. coli as described in U.S. Reissued Pat. No. RE37,393 herein incorporated by reference. Another approach is to utilize metabolic engineering to increase carbon flow towards oxaloacetate for the enhancement of succinate production as described in U.S. Pat. No. 6,455,284 herein incorporated by reference. The acid produced by the fermentation process decreases the pH of the fermentation broth. However, optimal pH values for culture of the organisms is about pH 7, so a base is added to maintain the pH of the broth. The succinic acid reacts with the base to form the corresponding succinate salt. Bases such as sodium hydroxide or potassium hydroxide can be used to maintain the pH, thereby forming disodium succinate or dipotassium succinate salts, respectively. This process is described in U.S. Pat. No. 6,265,190 herein incorporated by reference. These water soluble salts of succinic acid can then be used in the present invention.

Ethanol is another inexpensive renewable resource, produced from the breakdown of cellulose, starch, and sugar containing materials such as corn as described in U.S. Pat. No. 6,509,180 herein incorporated by reference. The U.S. ethanol production capacity is considerable. There are two major production processes, namely wet milling and dry milling. Dry milling requires the corn to be ground into a fine flour which is then formed into a mash with water.

Enzymes and ammonia are added to convert the starches to glucose. The mash is heated to kill bacteria, and then fermented with yeast. Wet milling is a process whereby the grain is first soaked in a dilute acid. Next, the slurry formed is ground to remove the corn germ, which is used to make corn oil. The remaining starches are separated and fermented into ethanol.

Ethanol is in great supply in the United States, and is therefore an inexpensive means to decrease the freezing point of aqueous solutions. Ethanol has also been proven non-corrosive and effective as an additive in automotive fuels, and has been previously used in engine coolants. The addition of acetate salts to aqueous ethanol solutions further lowers the freezing point of the solution.

Acetic acid can be produced by industrial fermentation, however extraction of the acetic acid is still an expensive process. Making this process more economically feasible is currently under development. Biological production of acetate is a topic addressed in U.S. Pat. Nos. 5,173,429; 5,593,886; 5,807,722; 6,340,581; and 6,368,819 herein incorporated by reference. While acetate salts are excellent at decreasing the freezing point of an aqueous solution, they are corrosive to some metals. The addition of succinate salts provide corrosion protection in the presence of acetate, which allows blending. Dicarboxylic acids salts by themselves do not provide sufficiently low freezing point depression to allow them to be used as engine coolants/antifreeze. However, aqueous solutions of potassium succinate, potassium acetate, and ethanol have sufficiently low freezing points so as to make them acceptable as engine coolant/antifreeze.

Succinic acid, ethanol, acetic acid and its sodium and potassium salts, are allowed in food products by the U.S. Food and Drug Administration. All of the components of the composition can also be produced by fermentation of renewable resources and are degraded by natural processes in the environment. The solutions of the three components are non-corrosive to engine parts.

EXAMPLE 1

A chilled bath was constructed using an insulated "ice chest" with the aid of a Neslab (Thermo Neslab, Portsmouth, N.H.) CC-65 immersion chiller connected to a Neslab (Portsmouth, N.H.) CRYOTROL temperature controller and a Cole-Parmer (Cole-Parmer Instrument Company, Vernon Hills, Ill.) STIR-PAK stirrer for circulating water. Polyscience (PolyScience, Niles, Ill.) HEAT TRANSFER FLUID XLT heat transfer fluid was used with a temperature range of −73° to 45° C. The temperature of the heat transfer fluid was monitored using a thermometer recommended for measurement of aviation fuel freezing points as per ASTM 114C/IP with a temperature range of −80° to 20° C. from ERTCO (Dubuque, Iowa). Measurement of freezing points of sample solutions was conducted in FALCON 14 ml polypropylene round-bottom tubes (17×100 mm style) from Becton Dickinson Labware (San Jose, Calif.). Potassium succinate was purchased from Pfalts & Bauer, Inc. (Waterbury, Conn.), potassium acetate was purchased from Sigma Chemical Company (St. Louis, Mo.), and ethanol was purchased from Pharmco Products, Inc. (Brookfield, Conn.). The solutions were prepared using reverse osmosis (RO) water.

Freezing points of numerous compositions made of potassium succinate, potassium acetate, and ethanol in cumulative 50% wt. (weight percent) aqueous solutions were measured. Samples were placed in tubes along with a few grains of activated carbon to provide an irregular surface for nucleation. The tubes containing the samples were placed in a rack immersed in the heat transfer fluid. The heat transfer fluid was incrementally cooled down to −45° C. from room temperature, over an 8-hour period. The state of the samples in the tubes was monitored regularly and those that froze were noted along with the corresponding temperature.

Table 1 illustrates the observed freezing points of tested aqueous compositions. The compositions were 50% wt. aqueous solutions containing five grams (5g) of water. The grams of potassium succinate, grams of potassium acetate, and grams of ethanol, along with the corresponding freezing point ° C. are given.

TABLE 1

| Potassium Succinate (g) | Potassium Acetate (g) | ethanol (g) | Freezing Point (° C.) |
| --- | --- | --- | --- |
| 0 | 5 | 0 | −52.0 |
| 1 | 4 | 0 | <−45.0 |
| 2 | 3 | 0 | <−45.0 |
| 3 | 2 | 0 | −44.5 |
| 4 | 1 | 0 | −35.0 |
| 5 | 0 | 0 | −29.0 |
| 4 | 0.75 | 0.25 | −37.0 |
| 4 | 0.25 | 0.75 | −41.0 |
| 3.5 | 1 | 0.5 | −42.0 |
| 3.5 | 0.5 | 1 | <−45.0 |
| 3 | 1.5 | 0.5 | −44.5 |
| 3 | 0.5 | 1.5 | <−45.0 |
| 0 | 0 | 5 | −43.0 |
| 0 | 0 | 0 | −2.0 |
| 4 | 0 | 1 | −40.5 |
| 3 | 0 | 2 | −43.0 |
| 2 | 0 | 3 | <−45.0 |
| 1 | 0 | 4 | −43.5 |
| 0 | 4 | 1 | <−45.0 |
| 0 | 3 | 2 | <−45.0 |
| 0 | 2 | 3 | <−45.0 |
| 0 | 1 | 4 | <−45.0 |
| 4 | 0.5 | 0.5 | −38.0 |
| 0.5 | 4 | 0.5 | <−45.0 |
| 0.5 | 0.5 | 4 | <−45.0 |
| 3 | 1 | 1 | −44.0 |
| 1 | 3 | 1 | <−45.0 |
| 1 | 1 | 3 | <−45.0 |
| 2 | 1.5 | 1.5 | <−45.0 |
| 1.5 | 2 | 1.5 | <−45.0 |
| 1.5 | 1.5 | 2 | <−45.0 |

The minimum temperature that was attainable with the equipment employed was −45° C. Therefore, any composition that was not frozen at −45° C. is noted as such. The freezing point of 50% wt. aqueous potassium acetate was obtained from a report submitted to the U.S. Department of Agriculture SBIR program.

Figure 2:
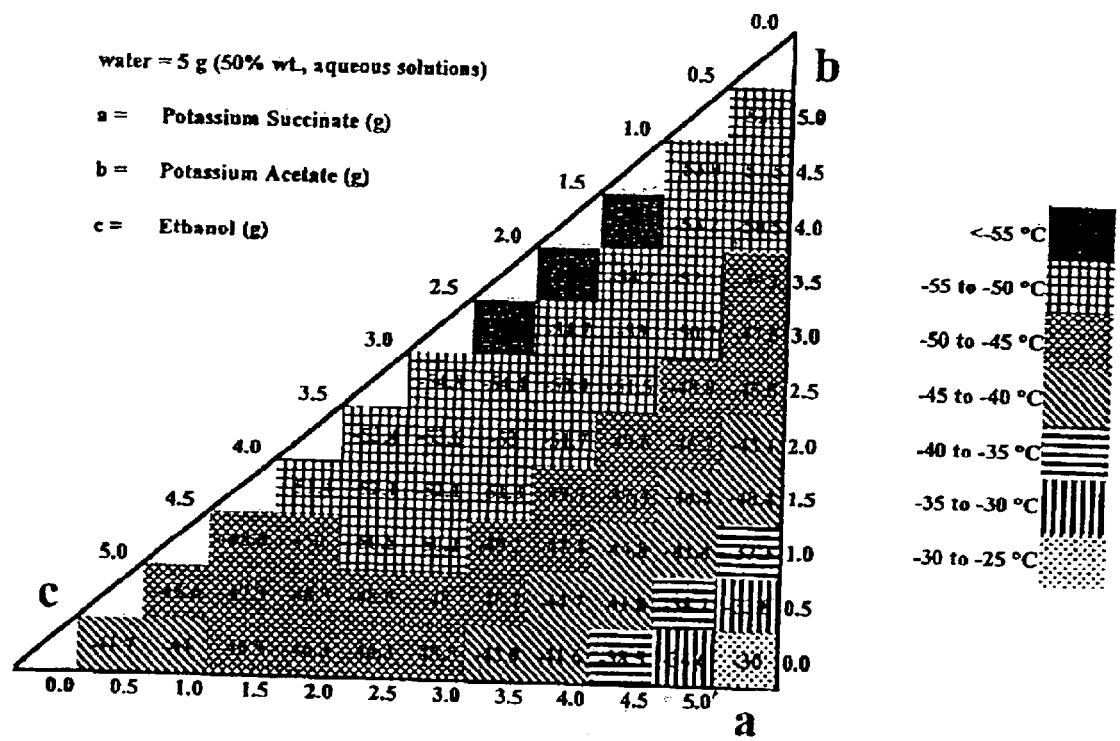
FIG. 2 illustrates the dependency of freezing point depression on tested 50% wt. aqueous compositions, where a=grams of potassium succinate, b=grams of potassium acetate, and c=grams of ethanol.

An empirical model was developed to approximately represent the freezing point depression of the three dimensional compositions. The model is based on a second order polynomial and the insignificant coefficients were eliminated using regression tools available in Microsoft (Redmond, Wash.) EXCEL software. Due to the limitations of the equipment, the model is not comprehensive. However, it provides a reasonable snapshot of freezing point depressions of 50% wt. aqueous solutions containing potassium succinate, potassium acetate, and ethanol. The correlation between the data and the model is presented in FIG. 1. The empirical model can be represented by the following formula:

$$fp = -2 - 5.6a - 10b - 7.9c - 0.7ab - 1.5ac - 1.3bc$$

where fp=freezing point (° C.), a=grams of potassium succinate, b=grams of potassium acetate, and c=grams of ethanol. The model reasonably predicts the freezing points of 50% wt. aqueous solutions. A graph of the data is illustrated in FIG. 2.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A liquid biodegradable antifreeze composition as a concentrate for use as an engine coolant which comprises:
   (a) a water soluble salt of succinic acid;
   (b) a water soluble salt of acetic acid; and
   (c) ethanol, wherein the composition is formulated to be mixed with water to provide a freezing point of lower than −30° C. in the engine.

2. The composition of claim 1 wherein the salts are potassium salts.

3. The composition of claim 1 wherein the succinate salt is dipotassium succinate.

4. The composition of claim 1 which when diluted with water contains between about 0.1 to 50% by weight of potassium succinate, 0.1 to 50% by weight of potassium acetate and 0.5 to 55% by weight of ethanol.

5. A liquid antifreeze composition as an engine coolant which comprises:
   (a) a water soluble salt of succinic acid;
   (b) a water soluble salt of acetic acid;
   (c) ethanol; and
   (d) water, wherein the composition provides a freezing point of lower than −30° C. in the engine.

6. The composition of claim 5 wherein the salts are potassium salts.

7. The composition of claim 5 wherein the succinate salt is dipotassium succinate.

8. The composition of claim 5 wherein the composition which is diluted with water contains between about 0.1 to 50% by weight of potassium succinate, 0.1 to 50% by weight of potassium acetate and 0.5 to 55% by weight of ethanol.

9. A method for cooling an engine with a cooling system which comprises providing:
   (a) liquid antifreeze composition as an engine coolant which comprises: a water soluble salt of succinic acid; a water soluble salt of acetic acid; ethanol; and water, wherein the composition provides a freezing point of lower than −30° C. in the engine;
   (b) introducing the composition into the cooling system of the engine; and
   (c) running the engine containing the coolant.

10. The method of claim 9 wherein the salts are potassium salts.

11. The method of claim 9 wherein the succinate salt is dipotassium succinate.

12. The method of claim 9 wherein the composition which is diluted with water contains between about 0.1 to 50% by weight of potassium succinate, 0.1 to 50% by weight of potassium acetate and 0.5 to 55% by weight of ethanol.

* * * * *